(12) United States Patent
Caine et al.

(10) Patent No.: US 10,100,690 B2
(45) Date of Patent: Oct. 16, 2018

(54) METHOD AND SYSTEM FOR EXHAUST EMISSIONS CONTROL

(71) Applicant: Ford Global Technologies, LLC, Dearborn, MI (US)

(72) Inventors: Jon Edward Caine, South Woodham Ferrers (GB); Tim Winstanley, Bishops Stortford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 15/234,905

(22) Filed: Aug. 11, 2016

(65) Prior Publication Data

US 2017/0044948 A1 Feb. 16, 2017

(30) Foreign Application Priority Data

Aug. 14, 2015 (GB) .................................. 1514473.6

(51) Int. Cl.
*F01N 3/00* (2006.01)
*F01N 3/20* (2006.01)
(Continued)

(52) U.S. Cl.
CPC .......... *F01N 3/2006* (2013.01); *F02B 37/183* (2013.01); *F02B 39/04* (2013.01); *F02B 39/10* (2013.01); *F02D 41/0007* (2013.01); *F02D 41/029* (2013.01); *F02D 41/0255* (2013.01); *F02D 41/0275* (2013.01); *F02D 41/1446* (2013.01); *F01N 2430/00* (2013.01); *F02B 33/40* (2013.01); *F02B 37/04* (2013.01); *F02B 37/18* (2013.01); *F02B 37/24* (2013.01);
(Continued)

(58) Field of Classification Search
USPC ......... 60/274, 275, 280, 284, 286, 287, 288, 60/289, 300, 598, 600, 602, 605.1, 607, 60/608, 609, 612
See application file for complete search history.

(56) References Cited

U.S. PATENT DOCUMENTS

| 4,903,488 A | 2/1990 | Shibata |
| 5,704,323 A | 1/1998 | Gardell et al. |

(Continued)

FOREIGN PATENT DOCUMENTS

| FR | 2990467 A1 | 11/2013 |
| GB | 2492354 A | 1/2013 |

(Continued)

OTHER PUBLICATIONS

Examination Report of Great Britain Patent Application No. 1514473.6, dated Jan. 26, 2016, 7 pages, United Kingdom Intellectual Property Office.

*Primary Examiner* — Binh Q Tran
(74) *Attorney, Agent, or Firm* — Julia Voutyras; McCoy Russell LLP (57) ABSTRACT

A twin charged engine is provided comprising a catalytic converter; a first compressor which, when operated, increases engine load; a second compressor which extracts energy from the exhaust gases to increase the overall engine efficiency; and a controller configured to operate one of at least two modes. A first mode is a standard operating mode in which the system is configured to optimise the efficiency of running of the engine. A second mode is for use under special conditions.

10 Claims, 5 Drawing Sheets

(51) Int. Cl.
    *F02D 41/02* (2006.01)
    *F02D 41/00* (2006.01)
    *F02D 41/14* (2006.01)
    *F02B 39/04* (2006.01)
    *F02B 39/10* (2006.01)
    *F02B 37/04* (2006.01)
    *F02B 37/18* (2006.01)
    *F02B 37/24* (2006.01)
    *F02B 33/40* (2006.01)

(52) U.S. Cl.
    CPC ............... *F02D 2200/0802* (2013.01); *F02D 2200/0808* (2013.01); *Y02T 10/144* (2013.01); *Y02T 10/26* (2013.01)

(56) References Cited

U.S. PATENT DOCUMENTS

| | | | |
|---|---|---|---|
| 6,112,523 A | | 9/2000 | Kamo et al. |
| 6,295,817 B1 | | 10/2001 | Abthoff et al. |
| 7,958,730 B2 | | 6/2011 | Stewart |
| 8,157,035 B2 | * | 4/2012 | Whitney ............... B60K 6/365 |
| | | | 180/65.265 |
| 8,511,066 B2 | | 8/2013 | Harris et al. |
| 9,174,637 B2 | * | 11/2015 | Banker ................. B60W 10/06 |
| 9,328,642 B2 | * | 5/2016 | Yacoub ................. F01N 3/0878 |
| 9,482,149 B2 | * | 11/2016 | Barker ................. B60W 10/06 |
| 9,797,300 B2 | * | 10/2017 | Lofgren ................. F02B 37/14 |
| 2005/0000217 A1 | | 1/2005 | Nau et al. |
| 2006/0064981 A1 | | 3/2006 | Kojima et al. |
| 2013/0090832 A1 | | 4/2013 | Bevan et al. |
| 2014/0041380 A1 | | 2/2014 | Byrd et al. |
| 2014/0208745 A1 | | 7/2014 | Suhocki et al. |
| 2017/0028836 A1 | * | 2/2017 | Martin ................. B60K 6/445 |

FOREIGN PATENT DOCUMENTS

| | | |
|---|---|---|
| JP | 2015025386 A | 2/2015 |
| WO | 2013010924 A1 | 1/2013 |

\* cited by examiner

METHOD AND SYSTEM FOR EXHAUST EMISSIONS CONTROL

CROSS REFERENCE TO RELATED APPLICATION

This application claims priority to Great Britain Patent Application No. 1514473.6, filed Aug. 14, 2015, the entire contents of which are hereby incorporated by reference for all purposes.

FIELD

This present application relates generally to management of emissions from a twin charged engine during a cold engine start.

BACKGROUND/SUMMARY

Emission control legislation requires that the exhaust gases of internal combustion engines are treated prior to discharge from the exhaust tail pipe. Typically this treatment includes a reduction in the level of particulates and also the conversion, via a catalytic converter, of various undesirable chemicals found within the exhaust stream. The composition of the catalytic converter may depend on the fuel system used by the vehicle as different catalysts are optimised to deal with the exhaust gases from diesel and gasoline engines.

The chemical reactions that are undertaken within the catalytic converter have a temperature envelope in which they operate effectively. Below what is commonly referred to as the "light off" temperature, the catalytic converter does not operate effectively, which may result in unacceptable levels of some pollutants remaining within the exhaust stream. It is therefore desirable for the catalytic converter to reach "light off" temperature as soon as possible after the engine is started to mitigate the effects of the cold engine, which is prone to produce a higher of some pollutants than the engine at normal operating temperature.

The temperature of the catalytic converter is raised by the exhaust gases that are incident on it and also as a result of its proximity to other engine components that become hot when the engine is running. As combustion engines become more and more fuel efficient, the time taken for the catalytic converter to reach "light off" temperature may increase.

In order to promote efficient driving, many internal combustion engines are provided with one or more additional providers of boost. These may be turbochargers or superchargers. In twin charged engines, or multi-staged boosted engines, both a turbocharger and a supercharger may be provided.

In a twin charged engine, the supercharger is provided to improve the low-rpm performance of the engine and also to mitigate the time delay between the application of the throttle and the provision of the required boost from the turbocharger.

The present disclosure provides a reduction in catalyst "light off" time for a twin charged internal combustion engine.

According to the present disclosure there is provided a twin charged engine comprising a catalytic converter; a first compressor which, when operated, increases engine load; a second compressor which extracts energy from the exhaust gases to increase the overall engine efficiency; and a controller configured to operate one of at least two modes; wherein a first mode is a standard operating mode in which the system is configured to optimise the efficiency of running of the engine; wherein a second mode is for use under special conditions.

The special conditions may include an engine cold start, the regeneration of a Diesel Particulate Filter (DPF), and the desulphation of a Lean NOx Trap (LNT).

When the twin charged engine is operated in the special mode, the controller may be configured to use the first compressor until the catalyst "light off" temperature is reached.

When the twin charged engine is in the standard operating mode, the controller may be configured to use the second compressor in order to optimise the efficiency of running of the engine.

The twin charged engine may further comprise an exhaust gas recirculation system and wherein the controller may be further configured to activate the exhaust gas circulation system whilst the second compressor is bypassed.

The first compressor may be a supercharger, in particular a hybrid belt/electrically driven supercharger or an electric supercharger or a belt driven supercharger.

The second compressor may be a turbo-charger, in particular a fixed geometry turbocharger or a variable geometry turbocharger which may have a waste gate. The catalytic converter may be mounted on the exit of the turbo-charger.

When the twin charged engine is operated in the special mode, the controller may be configured to cause exhaust gases to bypass the turbo-charger by passing through the waste gate. The waste gate may be configured to provide a bypass for substantially all of the exhaust gases.

Furthermore, according to the present disclosure there is provided a method of starting up a twin charged engine; wherein the twin charged engine comprises a catalytic converter, a turbo-charger with a waste gate and a supercharger; the method comprising the steps of: opening the waste gate of the turbo-charger thus bypassing the turbo-charger; starting the engine and using the supercharger to modulate the air-fuel ratio; and monitoring the temperature of the catalytic converter; once catalyst "light-off" temperature is reached, closing the waste gate and reverting to normal operating sequence of the turbo-charger and the supercharger.

Furthermore, according to the present disclosure there is provided a method of operating a twin charged engine, wherein the twin charged engine comprises at least one exhaust gas filter, a turbo-charger with a waste gate and a supercharger; the method comprising the steps of: opening the waste gate of the turbo-charger thus bypassing the turbo-charger; using the supercharger to optimise the air-fuel ratio; regenerating the filter; monitoring the status of the filter; and once the filter has been regenerated, closing the waste gate and reverting to normal operating sequence of the turbo-charger and supercharger.

The disclosure pertains in general to twin charged engines which are well-known in the art and therefore only those aspects pertinent to the present invention will be described in detail.

There is provided a turbo-charger which is provided with a large bypass, typically termed a waste gate. In normal operation, the turbo-charger recycles the heat of the exhaust gases to drive a turbine which, in turn, causes an increase in the air introduced to the engine thereby improving the air to fuel ratio to increase the overall efficiency of the engine.

The bypass is used during normal operation to reduce the power of the turbo-charger. The bypass is configured to ensure minimum heat loss. The outlet of the turbo-charger is also configured to be as large as practical in order to prevent heat loss into the turbo-charger walls. The turbo-charger may have either fixed or variable geometry.

There is also provided a forced induction system driven by the engine. The forced induction system is typically a supercharger which adds to the engine load when it is running. a result, the running of the supercharger increases the energy of the exhaust. The supercharger may be a hybrid belt electrically driven supercharger or any other device capable of providing forced induction such as an electric supercharger or a belt driven supercharger. The can be used to fill in the response characteristics at low engine speeds to compensate for any deficiency from the turbo-charger. This also enables the waste gate to be at least partially under light load conditions in order to reduce the exhaust back pressure and thereby improve the fuel economy. The supercharger can also be used for transient response in order to eliminate turbo-charger lag. The presence of a supercharger may influence the choice of turbo-charger as, in some cases, the presence of a supercharger allows a fixed geometry turbo-charger to be used place of a variable geometry turbo-charger.

There is also provided a catalytic converter which includes one or more catalyst designed to reduce the levels of certain pollutants in the exhaust gas stream. The catalyst or catalysts typically have an envelope of operating temperatures. At the lower limit of this envelope is the so-called "light off" temperature. Until the catalyst is raised to this threshold temperature it does not operate effectively and therefore the levels of certain pollutants within the exhaust gas stream may exceed permitted levels. It is therefore important that the temperature of the catalyst is raised rapidly on engine start up in order to ensure that effective catalysis of the exhaust stream commences as soon as possible after the starting of the engine.

The catalytic converter is mounted on the exit of the turbo-charger in order to maximise thermal transfer from the turbo-charger to the catalytic converter during normal operation.

There is also provided an exhaust gas recirculation system (EGR) which has variable flow depending on the engine condition, i.e. the percentage of the exhaust gases that are recirculated can be changed according to the requirements of the engine. If the EGR flow is high, i.e. a large percentage of the gases are recirculated, this retains heat within the system and further contributes to the rapid heating of the catalytic converter to "light off" temperature. High EGR flow is compatible with the use of the supercharger and bypass of the turbo-charger. As such, the use of the supercharger or other forced induction system can be seen as an enabler for high EGR flow resulting in rapid catalyst "light off" with little heat lost to the turbo-charger because it is bypassed.

Control of these system elements is initiated in the ECU (engine control unit). The controller has at least two modes in which the system can be operated. The first mode is a normal operating mode in which the efficiency of operation is optimised. This includes the preferential use of the turbo-charger to harvest energy that might otherwise be wasted from the exhaust gases. The second, or special, mode reverses this logic and bypasses the turbo-charger, providing boost instead from the supercharger. This mode is appropriate for short term circumstances only, such as the start up from cold of the engine and also for regenerating a DPF or the desulphation of an LNT.

When the engine is started from cold, the ECU sends a signal to open the waste gate to its maximum extent so that the turbo-charger is substantially completely bypassed, or, where the size of the waste gate does not permit a total bypass, the extent of the bypass is maximised for the components of the system as presented. This configuration maximises the volume of hot exhaust gases that can flow directly onto the catalyst, thus heating the catalyst as rapidly as possible towards "light off" temperature.

If boost is required whilst the turbo-charger is bypassed, this is provided using the supercharger.

Opening the waste gate prior to catalyst "light off" has notable advantages. Because this configuration bypasses the turbo-charger, it minimises the boost provided by the turbo-charger during the start up of the engine. When the load is light, the boost level required may be minimal or zero. During this phase an exhaust gas recirculation system can be used to maintain the heat in the system and contribute to the efficient raising of the temperature of the catalyst. If the load on the engine increases prior to catalyst "light off" additional boost can be provided by running the supercharger to increase the air to fuel ratio and thereby provide the requisite combustion control.

The bypass of the turbo-charger is provided via a waste gate is effectively a low pressure path for the exhaust gases and therefore the exhaust gases will travel directly to the catalytic converter so that no heat will be lost from the system within the turbo-charger, as this is effectively bypassed by the use of the waste gate.

The absence of the turbo-charger from the energy flow of the system means that there is no reduction in the exhaust enthalpy as would usually be caused by the running of the turbo-charger. This effect is compounded by the use of the supercharger to provide boost during start up which increases the engine load and therefore the exhaust energy level. As a result the time taken for the catalytic converter to reach "light off" temperature is reduced.

The vehicle ECU is configured to receive data from a plurality of sensors throughout the vehicle, each sensor being configured to provide data about one aspect of the status of one location within the vehicle. Amongst this plurality of sensors will be a number of temperature sensors that provide data to the ECU pertaining to the temperature in various parts of the vehicle including the temperature of the catalyst in the catalytic converter. The capacity of the DPF is also monitored and data is provided to the ECU in order to schedule the regeneration of the DPF. The sensors typically measure the temperature and back pressure through the DPF as the back pressure will increase with the accumulation of particulate matter. Regeneration can only take place when the temperature exceeds a predetermined threshold value for a specified time. If the vehicle undertakes lengthy high speed drives for example on motorways, then DPF regeneration can take place during normal driving. However, if the vehicle is primarily used for town driving then it may be difficult to achieve the conditions for a standard regeneration.

BRIEF DESCRIPTION OF THE FIGURES

The disclosure will now be further and more particularly described, by way of example only, and with reference to the accompanying drawings, in which.

DETAILED DESCRIPTION

Figure 1:
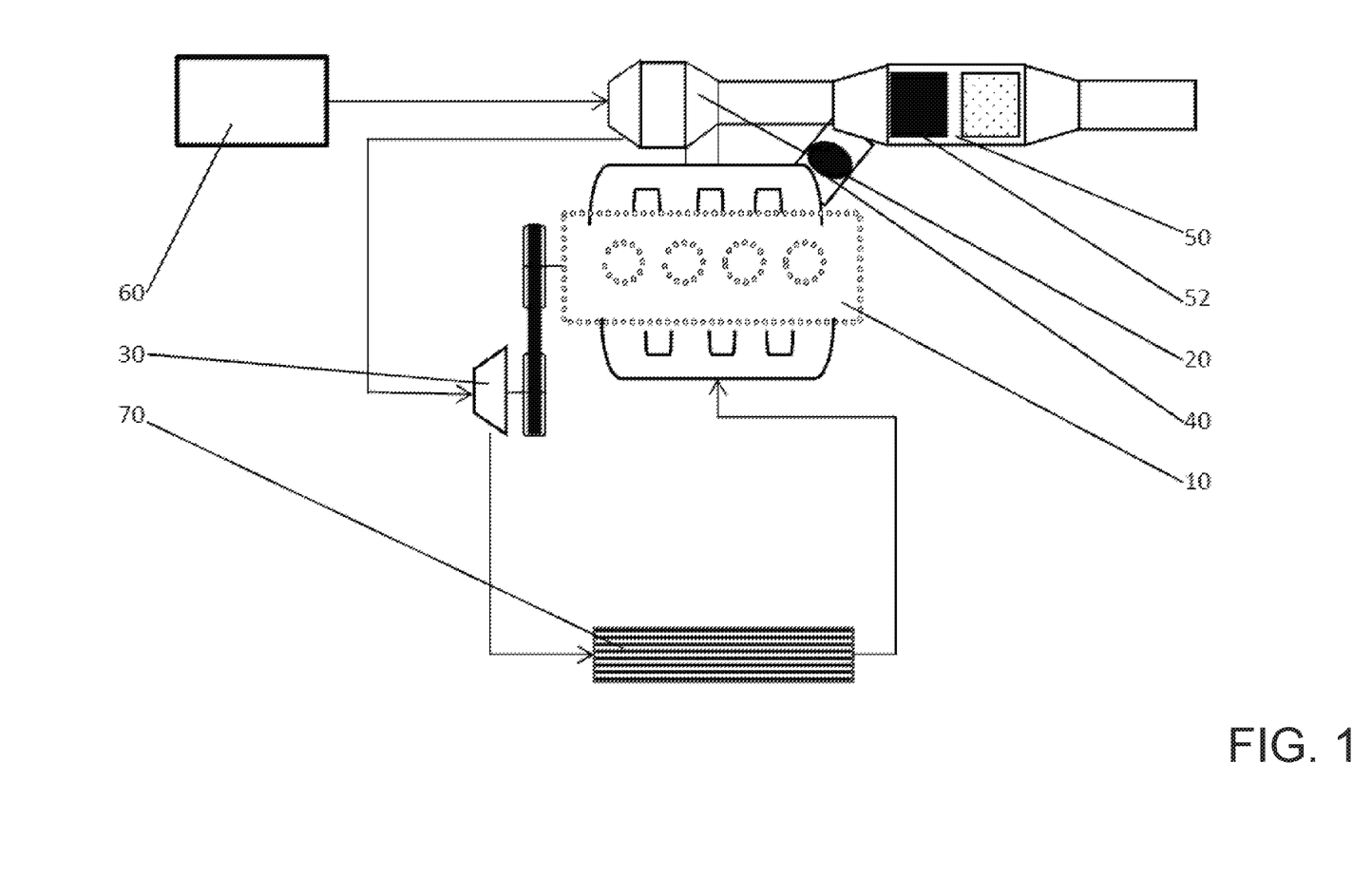
FIG. 1 is a schematic showing an example twin charged engine system for a vehicle.
Figure 2:
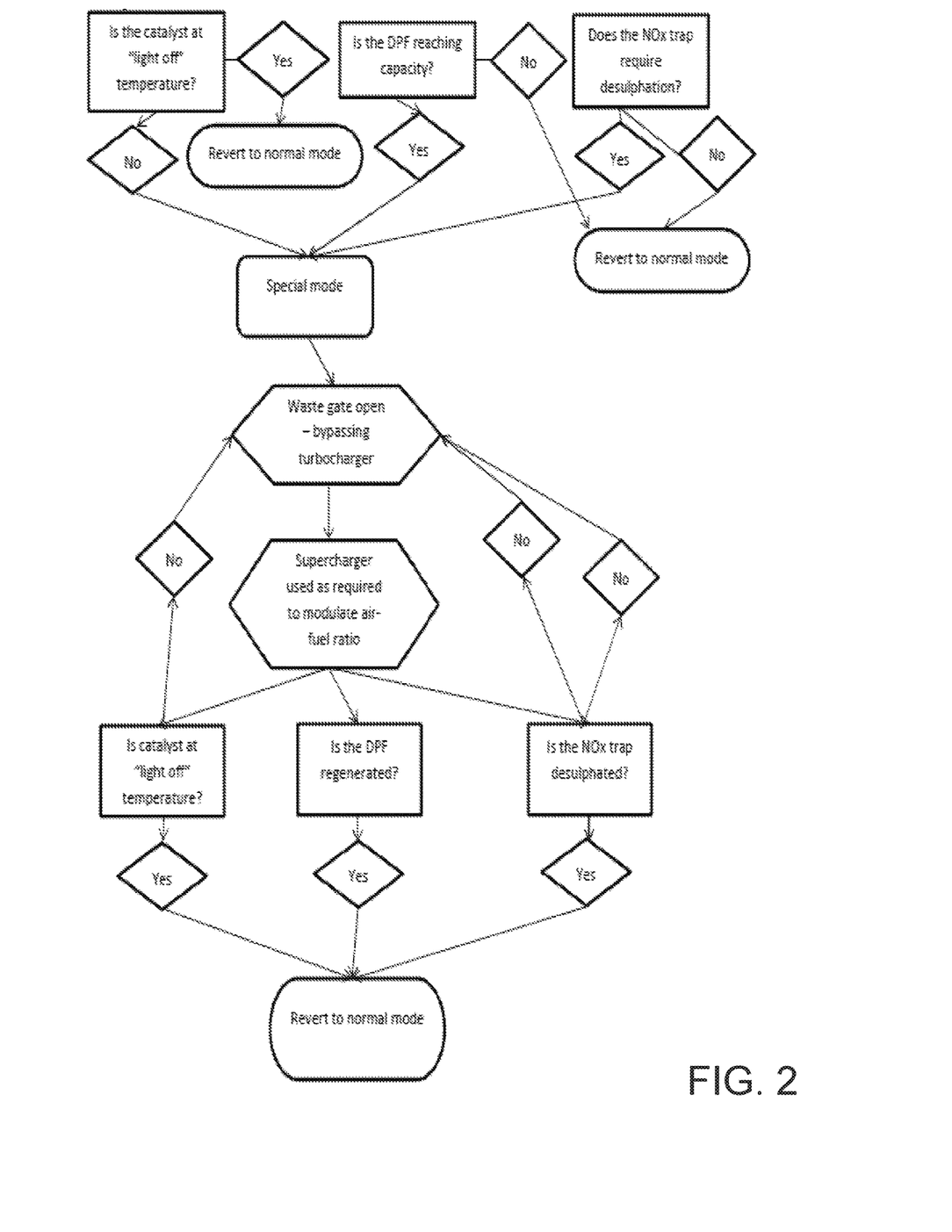
FIG. 2 is a flow diagram illustrating the steps taken by the controller in order to instigate the methods of the present invention in the system of FIG. 1.
Figure 3:
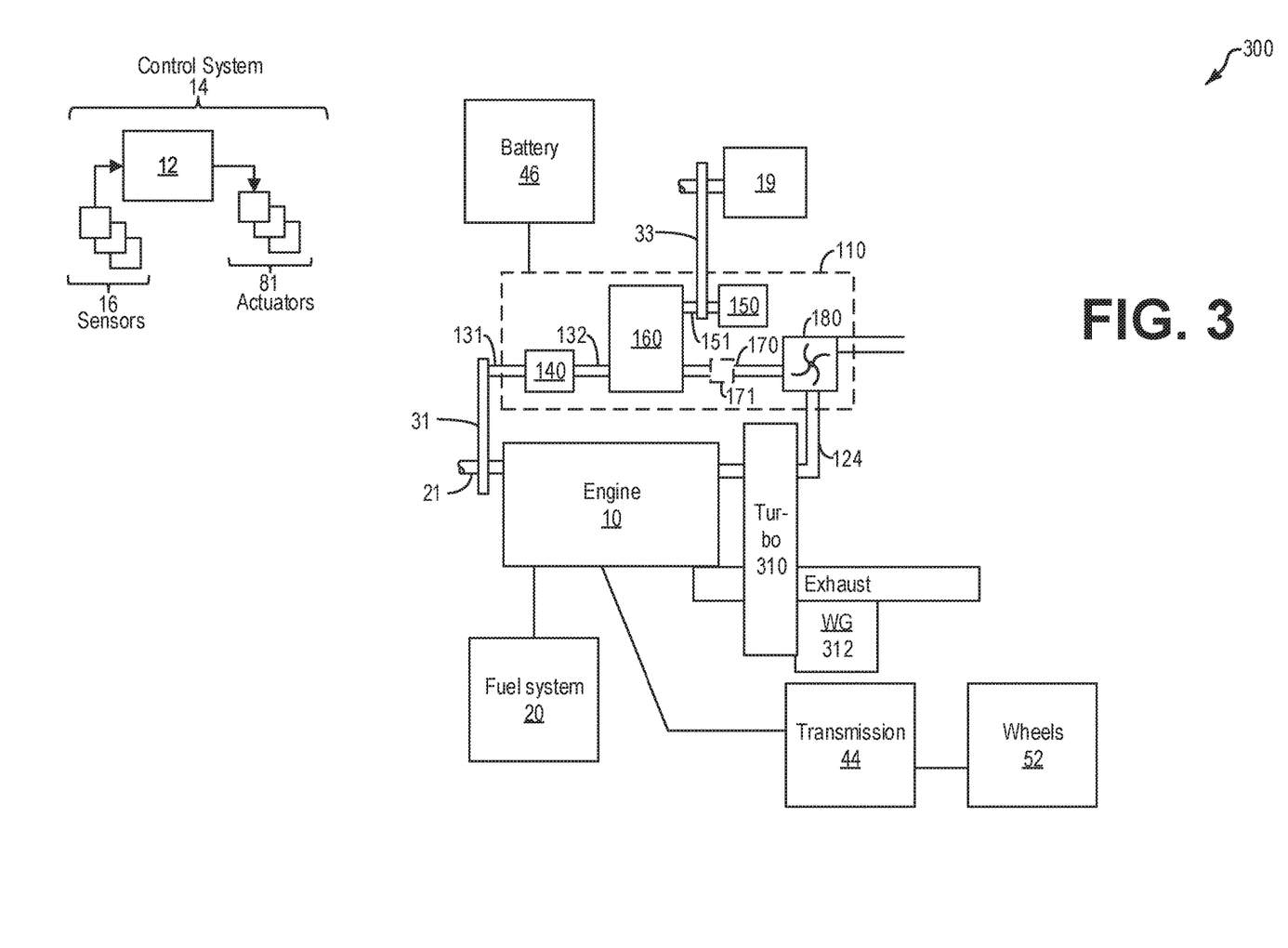
FIG. 3 shows a block diagram illustrating a vehicle including a supercharger incorporated into a powertrain of the vehicle.

Methods and systems are provided for operating a supercharger (or supergenerator) staged along with a turbocharger in a boosted engine system of a vehicle, such as in the system of FIGS. 1 and 3. A controller may be configured to perform a control routine, such as the example routine of FIGS. 2 and 4, to bypass the turbocharger during cold-start conditions so as to enable emissions control. At the same time, the supercharger output may be increased to provide boost control and to raise the temperature of engine exhaust, while absorbing excess engine torque at a generator coupled to the supercharger. An example engine operation during a cold-start is shown with reference to FIG. 5. In one example, a vehicle ECU acts as the controller for the methods of the present invention.

FIG. 1 shows the relevant parts of one example of a twin charged engine including a turbocharger 20 and a supercharger 30. The turbocharger 20 is provided with a bypass that enables the hot exhaust gases to pass directly from the engine 10 to a catalytic converter 50 which is provided with a catalyst 52. The air is filtered in an air filter 60 prior introduction to the turbocharger 20. The supercharger 30 loads the engine 10 when it is operated. The gaseous stream from the supercharger flows through a charge cooler 70 prior to reintroduction into the engine 10.

The illustrated example shows a series arrangement, although it will be apparent that the present invention could equally be embodied in a parallel arrangement. In a further example, not separately illustrated, a bypass and valves may be used to control airflow in the supercharger. The vehicle ECU acts as the controller for the methods of the present invention. One example of the flow of data and instructions is set out in FIG. 2.

With reference to FIG. 2, the vehicle is run in normal mode by default. This is the mode that is most fuel efficient thus minimising fuel consumption and providing the best energy efficiency. However, the vehicle ECU regularly checks to identify any circumstances that require the system to operate in the special mode.

The queries used to identify whether the special mode is required include whether the catalyst in the catalytic converter has reached "light off" temperature; whether the DPF requires regeneration and whether the LNT requires desulphation. If the catalyst in the catalytic converter remains below "light off" temperature, if the DPF requires regeneration or the LNT requires desulphation then the engine will be run in the special mode.

In the special mode, the waste gate is opened thereby bypassing the turbo charger. By bypassing the turbo-charger all of the heat of the exhaust gases is passed directly into the exhaust gas treatment area including the catalytic converter, DPF and LNT. The additional heat rapidly raises the temperature of the exhaust gas treatment area, raising the temperature of the catalyst in the catalytic converter to "light off" temperature as well as raising the temperature in the DPF LNT.

If boost is required, this is provided by the supercharger which is configured to modify the air to fuel ratio to optimise performance by providing boost in the absence of the turbocharger. Whilst this provision of boost is less efficient than the use of the turbocharger in terms of fuel economy, the benefit derived from the rapid "light off" of the catalyst in the catalytic converter and/or the timely regeneration of the DPF outweigh this short term reduction in fuel economy. During the time that the special mode is active, the ECU continues to monitor the various sensors indicating the temperature of the catalyst in the catalytic converter, the temperature and back pressure in the DPF and the status of the LNT. When the data received from these sensors indicates that the issue that caused the engine to be operated in special mode has been addressed, then the engine can revert to normal mode.

Turning now to FIG. 3, a schematic diagram of vehicle system 100 including a supercharger 110 and a turbocharger 310 fitted to an engine 10 is shown. The vehicle system 100 further includes an energy storage device or battery 46, a transmission 44, wheels 52, fuel system 20, one or more ancillary devices 19, and a control system 14.

An input shaft 131 of the supercharger 110 is mechanically coupled to the crankshaft 21 of the engine 10 via belt 31. Although not shown, the inlet of the compressor 180 is connected to draw air via an air filter as known in the art. It should be noted, however, that in some embodiments, the input shaft 131 of the supercharger 110 may be coupled to the crankshaft 21 by any suitable coupling. For example, a gear drive arrangement may be used.

The supercharger 110 is also mechanically coupled to an ancillary device 19 via belt 33 provide a front-end accessory drive (FEAD). The mechanically-driven ancillary device may be a water pump, power steering pump, vacuum pump, air pump, or other mechanically driven device (e.g., FEAD devices).

The supercharger 110 includes a first motor-generator 140 and a second motor-generator 150 housed in a housing of the supercharger 110. The supercharger 110 further includes an epicyclic gear train 160 provided between the two motor generators 140, 150. The input shaft 131 of the supercharger 110 is coupled to the rotor (not shown) of the first motor generator 140. The rotor of first motor generator 140 is further coupled to the annulus (not shown) of the epicyclic gear grain 160 via shaft 132. In some examples, the shaft 132 and the input shaft 131 comprise a same shaft. The carrier (not shown) of the epicyclic geartrain 160 is coupled to the rotor (not shown) of the second motor generator 150 via shaft 151. As depicted, the belt 33 coupled to the FEAD or ancillary device 19 is coupled to the supercharger 110 via the shaft 151.

The output shaft 170 of the supercharger 110 is coupled to the sun wheel (not shown) of the epicyclic gear train 160 and the compressor 180. As one example, the output shaft 170 may be coupled to the impellor (not shown) of the compressor 180. In some examples, the shaft 151 may be hollow such that the shaft 170 may extend therethrough to the compressor 180. At the output end of the supercharger 110, the output of the compressor 180 is connected to an intake manifold 124 of the engine 10.

In some examples, the speed of the first motor generator 140 is fixedly linked to engine speed, while the second motor generator 150 is free to rotate relative to the first motor generator 140 and the engine 10. If the second motor generator 150 and the carrier to which it is coupled stationary, the epicyclic gear train 160 acts to rotate the sun gear and hence the output shaft 170 and the impellor of the compressor 180 more quickly than the annulus, and hence more quickly than the input shaft 131, the first motor generator 140, and the engine 10 to which the annulus is coupled. If, however, the second motor generator 150 is operated to rotate in a direction to that of the first motor generator 140, the epicyclic gear train 160 acts to rotate the impellor more quickly. If the second motor generator 150 is operated to rotate in the same direction as of the first motor generator 140, the epicyclic gear train 160 acts to rotate the impellor more slowly. Thus, the second motor generator 150 can be used to increase or decrease the speed of impeller relative to the speed of the input shaft 131 and hence the engine 10, and thereby to vary the pressure of air in the inlet manifold 124, also known as the boost pressure. In this way, supercharger 110 is configured as a supergenerator.

Alternatively, in some examples, the first motor generator 140 may be driven to provide auxiliary torque to the crankshaft 21 of the engine 10 via belt 31. In other examples, the second motor generator 150 may be driven to mitigate torque transients. In such examples, the supercharger 110 may include a one-way clutch 171 on the output shaft 170 to selectively engage or disengage the epicyclic gear train 160 from the compressor 180 when controlling the second motor generator 150 to mitigate torque transients.

Further, the supercharger 110 may be coupled to the battery 46 of the vehicle and may be configured to charge the battery 46 during engine operation. For example, the supercharger 110 may be configured to convert the mechanical energy generated while running engine 10 to electrical energy for storage in battery 46. In this way, the supercharger 110 may function as a generator and/or an alternator/starter of the vehicle system 100.

The vehicle drivetrain further includes a turbocharger 310. The turbocharger may a compressor coupled to the engine intake manifold, the compressor driven by an exhaust The turbine may be coupled upstream of one or more exhaust catalysts in the engine. During conditions when turbine spin-up is required, such as to provide boost pressure, a wastegate valve 312 may be closed to divert a larger portion of exhaust through the turbine. During other conditions, when catalyst heating is required, the wastegate valve may be opened to divert to the catalysts while bypassing the turbine of turbocharger 310.

One or both of turbocharger 310 and supercharger 110 may be used to provide a boosted input to the engine. For example, during engine cold-start conditions, while the turbocharger turbine spins up, supercharger 110 may be used to meet the boost demand. After the turbine has spun up, the turbocharger may be used to meet the boost demand while the supercharger is disabled. As elaborated herein with reference to FIG. 4, during cold-start conditions when boost control and emissions control is required, the wastegate valve may be opened to direct hot exhaust to the catalyst for expedited warm-up, while the supercharger is operated to provide the demanded boost. In particular, the supercharger output may be increased to increase the temperature and flow of exhaust through the exhaust catalysts while the motor coupled to the supercharger is operated in a generator mode to absorb torque in excess of demanded torque to provide boost control.

Engine 10 is coupled to transmission 44. Transmission 44 may comprise a manual transmission, automatic transmission, or combinations thereof. Transmission 44 may include a gear set having a plurality of gears. Further, various additional components may be included, such as a torque convertor, a final drive unit, and so on. Transmission 44 is shown coupled to drive wheels 52, which may contact a road surface.

The vehicle system 100 further includes a control system 14. Control system 14 is shown receiving information from a plurality of sensors 16 and sending control signals to a plurality of actuators 81. As one example, sensors 16 may include various pressure and temperature sensors, a fuel level sensor, various exhaust gas sensors, torque sensors, and so on. The control system may also send control signals to the actuators 81 based on input received from a vehicle operator and the plurality of sensors 16. The various actuators may include, for example, the transmission gears, the supercharger, the turbocharger, the wastegate valve, cylinder fuel an air intake throttle coupled to the engine intake manifold, the first motor generator 140, the second motor generator 150, the epicyclic gear train 160, and so on. The control system 14 may include a controller 12. The controller may receive input data from the various sensors or process the input data, and trigger the actuators in response to the processed input data based on instructions or code programmed therein corresponding to one or more routines. Example routines are described herein with regard to FIGS. 2 and 4. While FIG. 3 shows the supercharger compressor in the intake upstream of the turbocharger compressor, the order may be reversed if desired.

In one example of operation according to FIG. 3, a method may include operating a boosted engine, comprising: cold staring the engine from rest after it has cooled to ambient condition, there being no boost present upon initiation of the cold start operation; during the cold-start after running up the engine to at least an idle speed, and responsive to catalyst temperature being below a threshold temperature, fully opening a wastegate valve to bypass an exhaust turbine of a turbocharger thus avoiding generation of boost via the turbocharger; and driving a supercharger coupled to the engine to generate boost. The supercharger may be driven by a combination of the engine crankshaft and a first electric motor powered via stored battery charge, both acting to increase boost beyond what would be provided during the cold start at the idle operation without power from the first motor, where the first motor and crankshaft are mechanically coupled to the compressor of the supercharger via an epicentric gear, as well as via further second electric machine, where a gear ratio between the crankshaft and the supercharger compressor is variable in real time by the controller by adjusting motor output (positive and negative) of the first and second electric motors coupled with the geartrain. The method may further include adjusting a boost output of the supercharger and an amount of torque absorbed by one of the motors (e.g., the second motor) independently from one another but both based on driver demanded torque (so as to maintain a desired engine output torque) and catalyst temperature (to provide increased boost when temperature is below the desired temperature. In this way, one motor can absorb excess engine power from the crankshaft (via the geartrain) when needed to enable a controlled amount of increased boost (via the other motor) to be provided so to increase exhaust temperature quickly. In other words, independent control of the first and second motors enable variation of the gear ratio between the crankshaft and the supercharger compressor as a way to control the level of boost to give the desired amount of boost, while the other motor enables independent control of excess engine combustion torque absorbed from the crankshaft so as to not generate more engine output than is requestd by the operator. Such operation provides increased temperature and quicker catalyst heating while still providing good driveability and torque control, without requiring spark retard which can reduce fuel economy. However, spark retard may be used in addition if desired.

Figure 4:
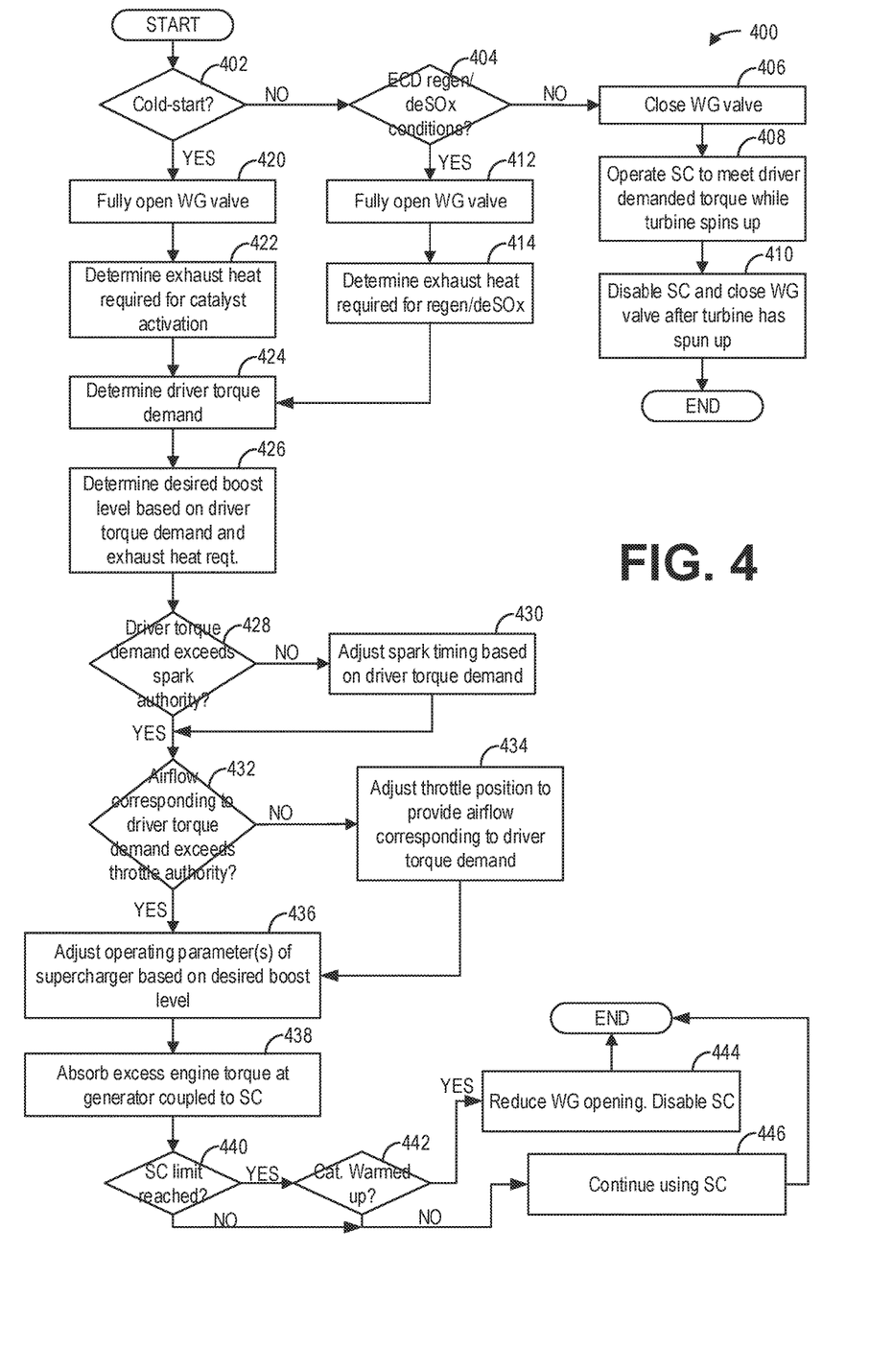
FIG. 4 shows an example method for leveraging the supercharger of FIG. 3 to provide emissions control and boost pressure control while a turbocharger is disabled.

Turning now to FIG. 4, an example method 400 is shown for operating the boosted engine system of FIG. 3 to enable boost control and emissions control, in particular during conditions when catalyst activation is required, such as during a cold-start.

At 402, the method includes confirming an engine cold-start. A cold-start may be confirmed if the ambient temperature of the vehicle, or the engine temperature, at the engine start below a threshold. As such, below the threshold engine or ambient temperature, an exhaust catalyst temperature may be below an activation threshold, which may result in exhaust not being sufficiently treated before release. If a cold-start is not confirmed, at 404, it may be determined if regeneration or desulphation (deSOx) conditions are met for an exhaust emission control device (ECD). For example, regeneration may be required if an exhaust particulate filter load is higher than a threshold load. As another example, deSOx may be required if an exhaust LNT sulphate load is higher than a threshold load.

If neither conditions are met, then at 406, a hot start or heated engine conditions may be inferred. Accordingly at 406, the opening of an exhaust wastegate valve coupled to a turbocharger turbine may be reduced. In one example, the wastegate valve may be fully closed to divert exhaust gas through the turbine, expediting turbine spool-up.

If regeneration or deSOx conditions are confirmed, at 412, the exhaust wastegate valve may be opened, for example, fully or maximally opened. In addition, at 414, an amount of exhaust heat required to complete the regeneration or deSOX operation is determined. This includes determining an exhaust temperature and an exhaust flow rate required to regenerate the filter, or desulphate the NOx trap. Likewise, if cold-start conditions are confirmed, at 420, the exhaust wastegate valve may be opened, for example, fully or maximally opened. In addition, at 422, an amount of exhaust heat and an exhaust flow rate required to activate the cold catalyst is determined. This includes determining a difference between the current catalyst temperature and the threshold temperature.

At 424, from each of 414 and 422, the driver demanded torque is determined, for example, based on the operator pedal position. At 426, a desired boost level is determined based on (an aggregate of) the driver torque demand and the catalyst temperature. As such, this is a boost level desired from the supercharger. The desired boost level may be increased such that it is higher than the boost level required to only provide the driver demanded torque. As such, as the bost level increases, the flow rate of exhaust gas through the exhaust catalyst increases. In addition, a temperature of exhaust coming out of the engine increases. As such, both of these address the emission control issues associated with cold inactivated exhaust filters and catalysts.

At 428, it may be determined if spark authority is present. Spark authority may not be present if spark is advanced or retarded from MBT by more than a limit, such as a combustion stability limit. If spark authority is present, at 430 spark timing is adjusted based on driver demanded torque. For example, spark is retarded from MBT as the driver demanded engine torque falls below the desired boost level. From there the routine moves to 432 to determine if air flow corresponding to the driver demanded torque exceeds a throttle authority. Throttle authority may not be present if the intake throttle is already fully open or closed. If throttle authority is present, at 434, throttle position is adjusted based on driver demanded torque to provide an intake airflow corresponding to the driver demanded torque.

At 436, the method includes adjusting an operating parameter of the supercharger to provide the desired boost level via the supercharger. In one example, a current applied to a motor of the supercharger is adjusted to spin the supercharger compressor at a speed based on the desired boost level. In another example, an output of the supercharger is increased.

At 438, excess engine torque is absorbed at the generator of the supercharger. In particular, engine torque in excess of the driver demanded torque, generated due to the increased boost level of the supercharger, is absorbed at the generator of the supercharger. By absorbing the excess torque, the desired wheel torque is maintained while the desired boost level and exhaust flow conditions are met. The excess torque absorbed at the generator may be used to increase the state of charge (SOC) of an associated battery or other energy storage device.

At 440, it may be determined if a supercharger limit has been reached. In one example, the limit may be reached if the state of charge of the battery exceeds a threshold charge (e.g., the battery is fully charged). If not, at 442, it may be determined if the exhaust catalyst has sufficiently warmed up. Alternatively, it may be determined if the emission control device regeneration or deSOx has been completed.

If any of 440 or 442 is not confirmed, at 446, supercharger operation is continued at 428. Else, if any of 440 and 442 is confirmed, at 444, the wastegate valve opening is reduced to divert exhaust flow through the turbine, and the supercharger is disabled or deactivated.

Figure 5:
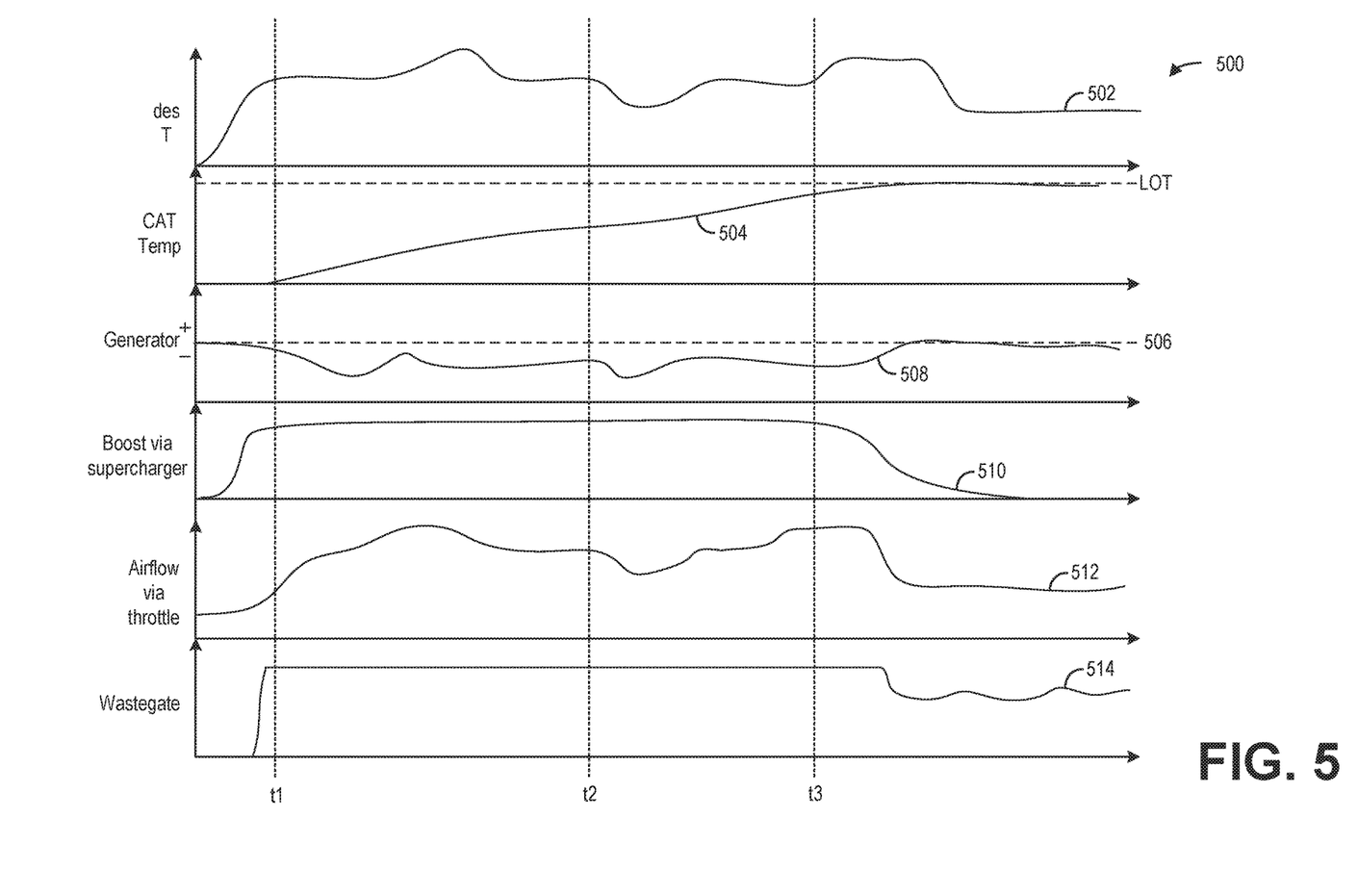
FIG. 5 shows an example coordination of operation of the supercharger and turbocharger for boost and emissions control.

FIG. 5 shows example operation of various parameter following the operation of the system, such as according to one or more of the various methods including those in FIGS. 2 and/or 4, for example. Specifically, FIG. 5 shows parameters as a function of time on the x-axis, with the parameters time-aligned such that the same time instances are shown as vertically aligned (e.g., t1). The graphs show the following parameter, starting with the top graph: desired torque (such as based on a driver pedal actuation), catalyst temperature, motor/generator torque (with positive torque meaning the motor/generator is applying torque to the engine crankshaft, and negative torque meaning torque is being absorbed and current generated), boost level from the supercharger, airflow through the air intake throttle, and wastegate position (with the lowest position being fully closed and the upper position being fully open).

The graph shows an example engine start (starting at the origin being a time of the start) where the catalyst has cooled to ambient conditions and thus is to be heated up to its light-off temperature (LOT) where its catalyst activity reaches a threshold level of conversion. As the catalyst warms, boost is supplied via the turbocharger to enable increased engine combustion torque, while the wastegate bypasses the turbocharger maximally at t1. To compensate for increased torque beyond that desired, the transmission system between the crankshaft and the compressor of the supercharger is adjusted (e.g., via a second electric machine) to enable torque absoption at the motor/generator, that amount variable so that total torque matches the desired as changes or the engine combustion torque changes from t1 through t2 to t3. Then, the operating mode can be changed so that the turbocharger generates desired boost since the catalyst has reached the LOT at t3.

In this way, the motors are controlled so as to provide the desired increased boost (more than would otherwise be necessary to meet torque demand), yet the increased engine torque as result is absorbed via the geartrain and one of the motors so as to maintain engine output torque as desired. In one example, the motors output are adjusted to keep the one motor always absorbing torque as a way to maximize exhaust temperature increase in the shortest time possible and reduce draining battery charge as the other motors adjusts its output (positive and/or negative) to keep the boost at the desired level.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter the present disclosure.

The invention claimed is:

1. A method for a boosted engine, comprising:
responsive to catalyst temperature below a desired temperature,
maximally opening a turbocharger wastegate valve;
increasing boost by driving a supercharger with an engine crankshaft through a geartrain, a first and second electric machine further coupled to the supercharger via the geartrain; and
absorbing excess engine output at the first machine, a desired boost level based on catalyst temperature relative to the desired temperature and driver demanded torque;
adjusting, via an intake throttle, an intake airflow to the engine based on the desired boost level; and
operating the engine with spark timing retard, an amount of spark retard based on the driver demanded torque.

2. The method of claim 1, wherein the desired boost level is increased as one or more of the driver demanded torque increases, and a difference between the catalyst temperature and the desired temperature increases.

3. The method of claim 1, wherein absorbing excess engine output includes absorbing an excess engine torque corresponding to a difference between driver demanded torque and actual engine torque, the actual engine torque determined as a function of the intake airflow and the amount of spark retard.

4. The method of claim 3, further comprising, while absorbing the excess engine output, maintaining supercharger boost at or above the desired boost level as driver demanded torque increases or decreases.

5. A method for a boosted engine, comprising:
responsive to catalyst temperature below a desired temperature,
maximally opening a turbocharger wastegate valve;
increasing boost by driving a supercharger with an engine crankshaft through a geartrain, a first and second electric machine further coupled to the supercharger via the geartrain;
absorbing excess engine output at the first machine, a desired boost level based on catalyst temperature relative to the desired temperature and driver demanded torque;
adjusting, via an intake throttle, an intake airflow to the engine based on the desired boost level; and
absorbing excess engine output until a limit of the supercharger is reached, and thereafter adjusting the intake throttle to reduce the intake airflow, and increasing an amount of spark retard applied.

6. The method of claim 5, wherein the first machine of the supercharger is coupled to the engine crankshaft further via a belt, and wherein the limit of the supercharger is based on a state of charge of a battery coupled to the first machine, the first machine being a motor-generator.

7. The method of claim 5, further comprising, in response to reaching an intake throttle limit or a spark retard limit, reducing the opening of the wastegate valve, and providing at least a portion of the driver demanded torque via the turbocharger.

8. The method of claim 1, wherein a compressor of the supercharger is staged upstream of a compressor of a turbocharger along an intake of the engine.

9. The method of claim 1, wherein the desired boost level is further based on one or more of a particulate matter load of an exhaust particulate filter, and a SOx load of an exhaust lean NOx trap, the desired boost level increased as one or more of the particulate matter load and the SOx load increases.

10. A system, comprising:
an engine including an intake and an exhaust;
a supercharger including a first compressor, an epicyclic gear train coupled to the first compressor, a motor coupled to the engine and further coupled to the epicyclic gear train;

a battery coupled to the motor;
a turbocharger including a second compressor driven by an exhaust turbine;
a wastegate valve coupled in a wastegate bypassing the exhaust turbine;
an emission control device including an exhaust catalyst; and
a controller configured with instructions stored in non-transitory memory that, when executed, cause the controller to:
   during conditions when the exhaust catalyst is below an activation temperature,
      fully open the wastegate valve to bypass the exhaust turbine;
      vary a current applied to the motor of the supercharger to generate a supercharger torque at the supercharger via a mechanical belt, wherein the supercharger torque is increased above a driver demanded torque as a difference between an exhaust catalyst temperature and the activation temperature increases; and
      absorb engine torque in excess of the driver demanded torque at a generator coupled to the supercharger.

\* \* \* \* \*